US008177624B2

(12) United States Patent
Graham et al.

(10) Patent No.: US 8,177,624 B2
(45) Date of Patent: May 15, 2012

(54) GAMING MACHINE PRINTING A TICKET FOR PROMOTING PLAY OF A BONUS EVENT

(75) Inventors: Jacob Graham, Reno, NV (US); Greg Schlottmann, Sparks, NV (US)

(73) Assignee: IGT, Reno, NV (US)

( * ) Notice: Subject to any disclaimer, the term of this patent is extended or adjusted under 35 U.S.C. 154(b) by 930 days.

(21) Appl. No.: 12/221,330

(22) Filed: Aug. 1, 2008

(65) Prior Publication Data

US 2010/0029373 A1 Feb. 4, 2010

(51) Int. Cl.
*G06F 17/00* (2006.01)

(52) U.S. Cl. ............................... 463/20; 463/21; 463/25

(58) Field of Classification Search .................... 463/16, 463/20, 25–30; 273/138.1, 292, 143 R
See application file for complete search history.

(56) References Cited

U.S. PATENT DOCUMENTS 7,128,650 B2 * 10/2006 Saffari ............................ 463/25
2003/0087691 A1 5/2003 Kiely et al.
2003/0186739 A1 10/2003 Paulsen et al.
2004/0002379 A1 1/2004 Parrott et al.
2004/0033095 A1 * 2/2004 Saffari et al. ............ 400/120.01
2004/0110557 A1 6/2004 Rowe
2005/0153768 A1 7/2005 Paulsen
2005/0266919 A1 * 12/2005 Rowe et al. ...................... 463/25
2006/0046842 A1 3/2006 Mattice et al.
2006/0194631 A1 8/2006 Rowe et al.
2008/0182644 A1 * 7/2008 Lutnick et al. .................. 463/20
2008/0214261 A1 * 9/2008 Alderucci ........................ 463/16
2008/0248865 A1 * 10/2008 Tedesco et al. ................. 463/25

* cited by examiner

*Primary Examiner* — Masud Ahmed
(74) *Attorney, Agent, or Firm* — Weaver Austin Villeneuve & Sampson LLP

(57) ABSTRACT

Disclosed are gaming machines, including related methods, apparatus, and systems, including computer program products, for promoting play of a bonus event in a wagering environment with one or more gaming machines providing games of chance. The gaming machines are configured to output an award for play of a game of chance. A wager to play a game of chance is received from a player at an input device of a gaming machine. An indication of occurrence of a trigger event is received for promoting play of a designated bonus event differentiated from games of chance. The designated bonus event excludes any bonus event on the gaming machine at which the wager is placed and/or the player is located. Responsive to the indication of occurrence of the trigger event, a ticket is output from an output device of the gaming machine. The ticket has no associated monetary value and has bonus information thereon. The bonus information authorizes participation in only the designated bonus event and can provide one or more plays of the designated bonus event.

30 Claims, 7 Drawing Sheets

GAMING MACHINE PRINTING A TICKET FOR PROMOTING PLAY OF A BONUS EVENT

TECHNICAL FIELD

The present invention relates generally to gaming machines, devices, and systems. More particularly, the present invention relates to gaming machines and devices capable of printing tickets for promoting play of bonus events.

BACKGROUND OF THE INVENTION

There are a wide variety of devices that can be connected to a gaming machine adapted for wagering, such as a slot machine or video poker machine. Some examples of these associated devices are lights, card readers, speakers, bill validators, coin acceptors, display panels, key pads, coin hoppers, button pads, ticket printers, and ticket readers, and integral ticket I/O devices capable of both printing and receiving tickets. Many of these devices are built into the gaming machine or components associated with the gaming machine such as a top box, which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a player's attention to various game features and to heighten the player's interest in additional game play. Maintaining a game player's interest in game play, such as on a gaming machine or during other gaming activities, is an important consideration for an operator of a gaming establishment.

Gaming establishments continue to seek new ways of attracting current and new game players. For example, besides common advertising, gaming establishments often offer "player rewards programs." In accordance with these programs, a player's game play is tracked. If the player's play reaches one or more levels, the player may be entitled to an award separate from any award paid by obtaining a winning outcome of a particular game played by the player. For example, a player's wagers may be tracked in the form of points. If the player reaches a level of play evidenced by the total points accrued, the player may be awarded a prize.

As technology in the gaming industry progresses, the traditional method of dispensing coins or tokens as awards for winning game outcomes is being supplemented by ticket dispensers which print ticket vouchers that may be exchanged for cash or accepted as credit of indicia in other gaming machines for additional game play. An award ticket system, which allows award ticket vouchers to be dispensed and utilized by other gaming machines, increases the operational efficiency of maintaining a gaming machine and simplifies the player pay out process. An example of such an award ticket system using tickets redeemable for credits or cash, is the EZ Pay™ ticket system by IGT of Reno, Nev. Award ticket systems and systems using other cashless mediums, such as smart cards, are referred to herein as cashless systems.

Currently, cashless systems have become very popular and have been embraced by customers. For example, ticket vouchers that are generated upon cashout and redeemed for cash or gaming machine credits within a particular casino are well accepted by game players. When a ticket voucher is generated in a gaming machine, the ticket voucher is typically printed on a media of some type such as paper. Various voucher parameters including a voucher value, an issue time, a place of issue, an identification number, graphics, etc., may be printed on the paper ticket. In addition, the voucher parameters may be stored electronically at some location for verification and auditing purposes. Once the ticket voucher is printed, a customer may remove the ticket and may utilize it for additional game play credits or redeem it for cash.

While cashless systems such as EZ Pay™ represent a significant advance in the art, cashless games and applications are still in their infancy, in some regards. Therefore, other cashless applications remain to be developed and implemented.

Traditionally, promotional cards with stored gaming credits have been provided to visitors in a gaming venue such as a casino for the purpose of promoting play across the spectrum of gaming machines at the venue. That is, the visitor, who might be, for example, a frequent customer, might be given such a promotional card as a reward for the visitor's past patronage and as an inducement for continued patronage. The visitor can then use the card and its credits in any gaming machine of her choosing.

While this mechanism may be useful for generating customer loyalty to a particular venue or chain of venues, it has not been effective for precisely directing customer behavior with respect to specific gaming machines or apparatus. Instead, if a casino or gaming machine manufacturer wanted to encourage customers to play to a new game, only standard marketing mechanisms, e.g., signage, advertising, have typically been employed. As will be understood, the fact that conventional promotional cards allow the customer to play any of the available gaming machines at a gaming establishment makes such cards ill-suited for promoting play of a specific gaming machine or device.

SUMMARY OF THE INVENTION

Disclosed are gaming machines, including related methods, apparatus, and systems, including computer program products, implementing and using techniques for promoting play of a bonus event.

According to one aspect of the present invention, a method for promoting play of a bonus event is provided in a wagering environment with one or more gaming machines providing games of chance. The gaming machines are configured to output an award for play of a game of chance. A wager to play a game of chance is received from a player at an input device of a gaming machine. An indication of occurrence of a trigger event is received for promoting play of a designated bonus event differentiated from games of chance. The designated bonus event excludes any bonus event on the gaming machine at which the wager is placed and/or the player is located. Responsive to the indication of occurrence of the trigger event, a ticket is output from an output device of the gaming machine. The ticket has no associated monetary value and has bonus information thereon. The bonus information authorizes participation in only the designated bonus event and can provide one or more plays of the designated bonus event.

According to one embodiment of the present invention, the designated bonus event can be provided on a bonus device, a table, and/or in a predetermined location of the gaming environment. The ticket can include information identifying a location of the designated bonus event. The designated bonus event can include an event such as a tournament, a Wheel of Fortune™ bonus, a raffle, or a lottery. In one implementation, the designated bonus event is provided on one or more less used gaming machines. In one implementation, the ticket has an expiration date for participation in the designated bonus event.

According to one embodiment of the present invention, the designated bonus event can be provided on one or more gaming machines other than the gaming machine at which the wager is placed and/or the player is located, for instance, at machines offering a designated game or game type. The one or more plays can correspond to a number of plays, a number of rounds, a number of spins, periodic play, a time period for play, and a period of accelerated play.

According to one embodiment of the present invention, the trigger event occurs responsive to play of the game of chance. The trigger event can also occur responsive to other events such as a bonus event on the gaming machine, and/or based on usage of the one or more gaming machines. For instance, the usage can be assessed over a time period. In one implementation, the trigger event occurs based on player tracking information identifying the player. The trigger event can also be a random event.

According to another aspect of the present invention, a gaming machine in a wagering environment provides one or more games of chance and is capable of promoting play of a bonus event. The gaming machine includes an input device adapted to receive from a player a wager to play one or more games of chance, a value output device adapted to output an award for play of the one or more games of chance, a gaming controller configured to receive an indication of occurrence of a trigger event for promoting play of a designated bonus event differentiated from game of chances, the designated bonus event excluding any bonus event on the gaming machine, and a ticket output device adapted to output, responsive to the indication of occurrence of the trigger event, a ticket having no associated monetary value, the ticket having bonus information thereon, the bonus information authorizing participation in only the designated bonus event and providing one or more plays of the designated bonus event.

According to another aspect of the present invention, a gaming apparatus such as a gaming machine in a wagering environment is capable of promoting play of a bonus event. The gaming apparatus includes: an input device adapted to receive from a player a wager to play one or more games of chance, a value output device adapted to output an award for play of the one or more games of chance, a ticket input device adapted to receive a ticket having no associated monetary value, the ticket having bonus information thereon, the bonus information authorizing participation in only a designated bonus event on the gaming machine and providing one or more plays of the designated bonus event, the designated bonus event differentiated from game of chances, and a controller configured to initiate play of the designated bonus event responsive to receiving the ticket having the bonus information.

In one embodiment, the controller is configured to initiate play of the designated bonus event responsive to receiving the ticket having the bonus information, independent of play of the one or more games of chance. The bonus output device can be adapted to output, responsive to play of the designated bonus event, a bonus prize. In one embodiment, the input device includes the ticket input device.

Another aspect of the invention pertains to computer program products including a machine-readable medium on which are stored program instructions for implementing any of the methods and/or apparatus described above. Any of the methods of this invention may be represented as program instructions and/or data structures, databases, etc. that can be provided on such computer readable media.

Aspects of the invention may be implemented by networked gaming machines, game servers and other such devices. These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems, apparatus and methods. These drawings in no way limit any changes in form and detail that may be made to the invention by one skilled in the art without departing from the spirit and scope of the invention.

DETAILED DESCRIPTION

Figure 1:
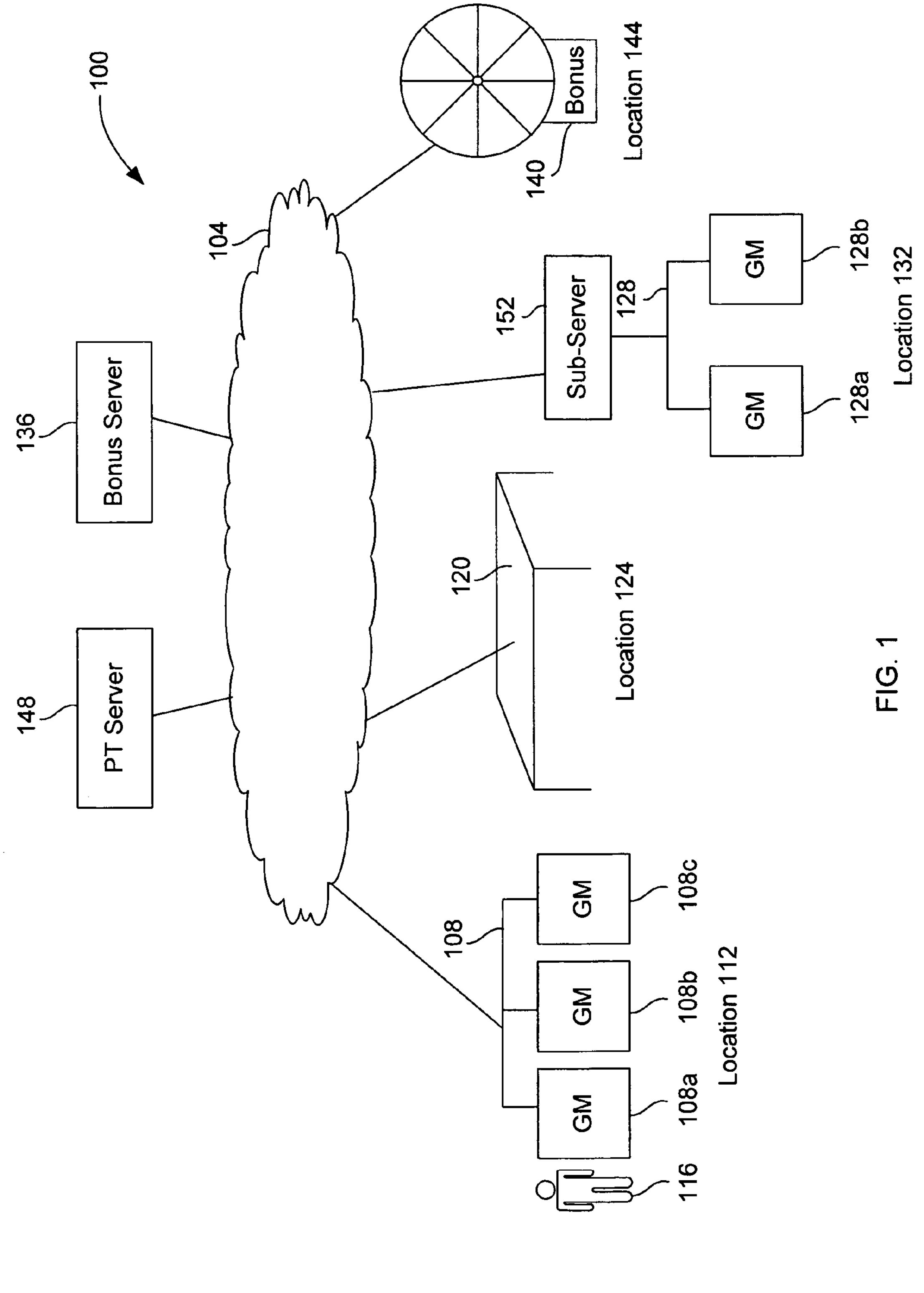
FIG. 1 shows a block diagram of a wagering environment 100 in which a plurality of gaming machines, table games, bonus devices, and other gaming apparatus are interconnected via a gaming network 104, constructed in accordance with one embodiment of the present invention.

Exemplary applications of apparatus, systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

Embodiments of the present invention include gaming methods, apparatus, and systems for issuing and using tickets, also referred to herein as receipts, for machine-specific promotions. In this way, casinos and other wagering game hosts can draw players to participate in and play specified events on designated gaming machines and/or bonus devices. In one embodiment, a gaming system includes one or more gaming machines. The gaming machine is adapted to accept credit from a player, present a game for play to a player, and pay a winning in the event a winning event is achieved by play of the game.

The concept of a "bonus" or "bonus event," as used herein, is rather expansive. In most instances, it supplements a "primary game" played on a gaming machine. The primary game is typically a slot game, video poker, keno, checkers, pachinko, or other game provided on the gaming machine. The bonus event sometimes involves an elaborate auxiliary game presented on a gaming machine, differentiated in that it is not directly accessible by players for wagering of credits, unlike the primary wagering games available on the machine. Other times, the bonus event involves a simple random or semi-random issuance of bonus awards not directly connected to a primary game on the machine.

The primary game has its own awards for winning outcomes. Bonuses supplement the "primary awards" issued for normal play of the primary game. Appropriate logic determines when a bonus should be issued. Typically, a bonus event is triggered by a trigger event, which can be defined as a predetermined or random event that occurs. At that point, the game logic instructs the machine to issue a cashless or other indicator of the bonus. The bonus event may be tied directly to some event in the primary game (e.g., a coin in or coin out event). It may also be tied to the quantity of play on the primary game. For example, after a certain length of playing time or a certain number of primary game awards, the probability of the bonus increases or the bonus becomes certain.

In one embodiment, the bonus event can be based on player tracking information. For instance, if the player tracking information indicates that the player is a preferred player, a member of a specified group, a recipient of a single win, or the like, a bonus can be triggered.

In one example, the bonus involves awarding players multiple win amounts that exceed the posted winnings on the gaming machine. By providing multiples of this type, preferred players, such as high rollers or members of exclusive gaming establishment clubs, can be afforded special treatment. Such special treatment can enhance the players' gaming experience and can encourage further game play at the gaming establishment.

Gaming machines described herein are arranged to print and accept tickets. As used herein, "ticket" refers to cashless indicia of a bonus award that may take many different forms. General examples include tokens, printed tickets, coupons dispensed by machines, information written to a smart card, player tracking card, or other instrument controlled by the player (at least temporarily), and information written to a database or other repository of data pertaining to the player. In one embodiment of a method, a player plays a game on the gaming machine and is issued a ticket in relation to: game play, the player's player tracking information, and/or one or more specified events related or unrelated to game play, depending on the particular implementation.

In one embodiment, the ticket is used in the play of the designated bonus event. For example, the tickets can be used to determine the outcome of the bonus game or event. In one example, one or more tickets are entered in the event and one or more tickets are selected from the group of entered tickets. The selected ticket or tickets determine the winner or winners of the bonus game or event. In one embodiment, a player utilizes an issued ticket in a designated bonus game or event different from a game of chance, such as the entry ticket in a lottery or raffle event. In one embodiment, the ticket includes printing for accepting a player's name, address or other identifying information. The player or a casino attendant can fill out the ticket and enter the receipt in the drawing.

In one embodiment, a player is issued a ticket in the event a particular outcome is received when playing a game at a gaming machine. In other embodiments, a receipt or ticket may be issued based upon other criteria. These criteria may comprise game play (even without a win), amounts bet, time of play, random issuance and the like.

In one embodiment, the ticket which is issued is purposely designated as not representative of any cash value or award. That is, the ticket has not associated monetary value or credits, and cannot be redeemed for cash or credits. As used herein, the term "value" may encompass gaming tokens, coins, paper currency, credit or debit cards, and any other object representative of value.

In one embodiment, tickets may be issued at other than a gaming machine. Tickets may be issued with hand-held portable devices or from a cashier or other stations. Tickets may also be issued responsive to monitoring of gaming machine and/or player activity by a back-end server providing instructions to a ticket printing device. For instance, in one server-based gaming implementation, a central server controls a bank or floor region of machines. The central server, monitoring activity on the machines it serves, detects the $N^{th}$ spin button press on any of its machines, and causes output of the promotional ticket at the machine where the button press occurs. Upon making such a determination, the server sends instructions to that machine to output the ticket.

The tickets dispensed in accordance with the methods and apparatus disclosed herein may be issued based upon a variety of criteria. In one embodiment, player game play activity is provided to a player tracking server in communication with a bonus server. One or both servers determines, based upon the game play activity information, whether a player is entitled to a ticket. Various server-based gaming data can be used as the basis on which to award a promotional ticket, such as various types of player tracking information, and gaming machine activity data.

In one embodiment, the methods and apparatus for using tickets described herein are implemented using selected services of a cashless system such as an EZ Pay™ ticket voucher system, as described herein. In one example, the EZ Pay™ system can be structured to include an additional field, specifying what machine can accept the promotional ticket. The promotional ticket stores a promotional code readable by a ticket I/O device on the bonus apparatus. This code is identifiable in a field by the EZ Pay™ system to validate the promotional ticket, so that the ticket can only be redeemed on the designated machine or apparatus. For example, in a server-based gaming implementation, upon receiving the ticket in a gaming machine hosting a designated bonus event, the gaming machine reads the promotional code, sends the code to an EZ Pay™ system server, the server validates the code for that gaming machine, and sends a confirmation signal back to the machine. Upon receiving the confirmation signal, the gaming machine permits the player to proceed with redeeming the promotional ticket for bonus play.

FIG. 1 shows a wagering environment 100 in which a plurality of gaming machines, table games, bonus devices, and other gaming apparatus are interconnected via a gaming network 104, constructed in accordance with one embodiment of the present invention. The wagering environment 100 shows one of countless examples of layouts, such as a casino, airport, hotel, or other gaming facility. In the example of FIG. 1, the gaming apparatus includes a bank 108 of gaming machines 108*a*, 108*b*, and 108*c*. The bank 108 of gaming machines is situated at a location 112, representing an identifiable region of a floor of the wagering environment 100. Thus, a player 116 can easily access any of the cluster of gaming machines 108*a-c* at location 112.

In FIG. 1, the wagering environment 100 further includes a table game 120 situated at a location 124. For instance, table game 120 may be located on a different floor or level than location 112, and/or in an area designated for play of table games, such as poker. The table game 120 includes supporting hardware, including ticket I/O devices for receiving and outputting player tracking cards, tickets, as well as providing further automated services to facilitate the play of table games.

In FIG. 1, a second bank 128 of gaming machines 128*a* and 128*b* are situated at a location 132 of the wagering environment 100. For instance, gaming machines 128*a* and 128*b* may provide games of chance having a common theme, different from a theme associated with bank 108 of gaming machines. In one embodiment, the respective banks 108 and 128 of gaming machines are also configured to play different bonus events associated with different themes. For example, gaming machines 108*a-c* may be configured to provide bonus play in the form of a tournament, in which any or all of gaming machines 108*a-c* can participate. Examples of such tournaments are slot tournaments, video poker tournaments, and traditional poker tournaments provided at a table. The tournament can have a designated theme, such as Indiana Jones®. By the same token, bank 128 of gaming machines can be constructed with apparatus to provide a different bonus event. In one embodiment, the type of bonus event or bonus theme of bank 128 of gaming machines is selected and controlled by a bonus server 136 or bonus sub-server 152 interconnected with bank 128 of gaming machines via network 104.

In FIG. 1, the bonus server 136 may be constructed in similar fashion as a player tracking server 148, and comprise a computer or group of computers and include memory or other data storage devices. In one embodiment, the bonus server 136 is adapted to store information regarding receipt or ticket information when a receipt or ticket has been or will be issued. The bonus server 136 can be integral with a payment host, such as an EZ Pay™ ticket voucher system, as described herein.

In one embodiment, in FIG. 1, the player tracking server 148 is associated with a player tracking/reward or "comp" function. The player tracking server 148 may thus be adapted to aggregate game play data regarding the players playing the gaming machines on the network 104. This player tracking data may include information such as the length of time of game play, amounts bet, amounts awarded, and a wide variety of other information. The player tracking host 44 may also store information regarding tickets which are issued, as described in more detail below. In general, each gaming machine is adapted to transmit the player tracking data over suitable communications interface(s) and paths in network 104 to the player tracking server 148.

In one embodiment, the bonus server 136 and the player tracking server 148 each include at least one data storage element for storing the player information. The data storage element may comprise a hard drive, RAM, tape drive, CD or other memory or data storage member or element. Each server 136 and 148 also includes necessary communications equipment, such as network cards or the like for receiving and sending information.

In FIG. 1, the wagering environment 100 further includes a bonus device 140 situated at a further location 144 of wagering environment 100. In one embodiment, the bonus device 140 is a dedicated machine implementing only bonus games or events, that is, events differentiated in form and/or operation from traditional games of chance provided on gaming machines, tables, or other traditional wagering apparatus. For example, the bonus device 140 can be constructed as a stand-alone Wheel of Fortune game in which one or more players at specified gaming machines can qualify to participate. In other examples, the bonus device 140 is configured to provide other bonus events such as tournaments, raffles, lotteries, and other events differentiated from traditional wagering games.

The wagering environment 100 of FIG. 1 can further include one or more ticket validation mechanisms. The manner by which information from these mechanisms is transmitted to and from other mechanisms, terminals and systems may vary. Various wired and wireless communications via network 104 are contemplated.

Figure 2:
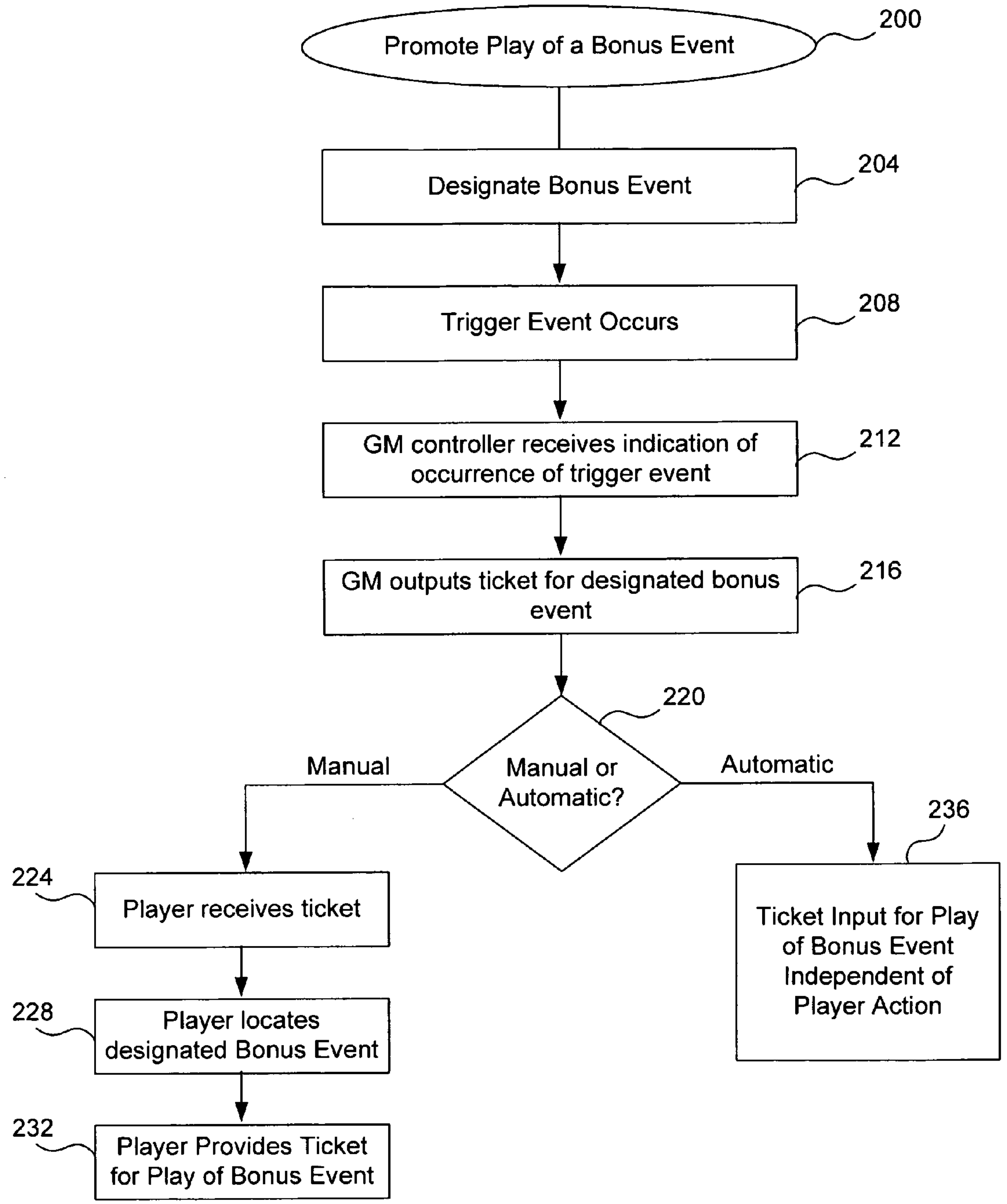
FIG. 2 shows a flow diagram of a method 200 of promoting play of a bonus event in a wagering environment, performed in accordance with one embodiment of the present invention.

FIG. 2 shows a method 200 of promoting play of a bonus event in a wagering environment, performed in accordance with one embodiment of the present invention. The method 200 of FIG. 2 is intended to represent one implementation of a scheme for promoting play of a bonus event using a ticket, in accordance with embodiments of the present invention. Those skilled in the art should appreciate that variations of method 200, in which certain steps can be interchanged or omitted, are intended to be within the scope of the appended claims.

In FIG. 2, a bonus event is designated, in step 204. The designation of a bonus event includes the determination and/or selection of suitable bonus events to promote, and can be based on one or more of a variety of criteria and/or factors. Examples of such bonus events include tournaments, raffles, lotteries, devices configured with bonus themes such as Wheel of Fortune, and other bonus events differentiated in nature from traditional wagering games of chance. Step 204 often includes, for instance, the identification of one or more specific bonus devices, gaming machines, and other apparatus offering bonus events, that the casino wishes to promote. Thus, in step 204, the designation of a bonus event can include identifying the associated apparatus on which the bonus event will be practiced, such as bonus device 140, or one or more designated gaming machines having associated bonus event apparatus, such as bank 128 of gaming machines 128*a* and 128*b*.

In one embodiment, the bonus event or events designated in step 204 are made to exclude any bonus events occurring or available on the gaming machine or other apparatus issuing the ticket. Thus, in this embodiment, after receiving the ticket, the player has to locate and interact with a separate bonus device or event than any such event on the gaming machine, which outputs the ticket.

In FIG. 2, in step 204, in one example, a bank of gaming machines offering bonus play is chosen to provide the designated bonus event, according to the specific games, types of games, or themes of games, available on those machines. In addition, in step 204, designation of a bonus event to be promoted can include an identification of a location, such as locations 112, 132, and/or 144 as being desirable to increase play. For instance, in one embodiment, a server monitors in real-time which machines/banks of machines are being played, and further gaming machine activity data for those machines. Such data can be monitored over a specified period of time. When the server identifies certain machines/banks as being under-played, promotional tickets can be issued at specified machines and apparatus, designating bonus events on the under-played machines to promote them. The server can designate different machines over time, as the usage data develops and changes over the defined periods.

For instance, bank 108 of gaming machines may be identified as having less than desirable usage over a period of time, or on particular designated days/nights of the week. Such a determination of less than desirable usage can be based on data monitoring gaming activity alone or in combination with player tracking data gathered from machines in a specific location, and determining that certain parameters of such activity data fall below a pre-determined threshold. Thus, for example, the gaming machines 108*a-c* can be designated as having a bonus event to promote, to increase player activity and wagering at location 112.

In FIG. 2, in step 204, other locations, banks of machines, and devices situated at identifiable locations can be selected for other reasons to promote a designated bonus event. Additional considerations such as proximity to restaurants, hotels, and other cooperating vendors can be factors in identifying a location of a bonus event to promote, as well as selecting a particular theme or type of bonus event associated with a partnering organization, in step 204.

In FIG. 2, after a bonus event is designated, in step 204, the method 200 continues when a trigger event occurs, in step 208, to initiate the promotion of the designated bonus event, in accordance with embodiments of the present invention. In step 208, a variety of trigger events can be defined to initiate the promotion, and can be structured in a manner to be responsive or unresponsive to gaming machine activity, depending on the desired implementation. In one embodiment, in which a trigger event is defined in a manner to be responsive to gaming machine activity, one or more various actions associated with a gaming machine can cause the trigger event to occur. Examples of such gaming activity are described herein with respect to FIG. 3.

In another embodiment, the trigger event occurs based on other information such as random events, casino-initiated promotions, player tracking information associated with a particular player of a gaming machine or table game, as well as monitored usage of machines and apparatus in the wagering environment. Such information can include collected player and/or gaming machine data monitored by a back-end server. The trigger event is generally pre-defined to occur responsive to the occurrence of such an event, such as the satisfaction of one or more criteria applied to the monitored player tracking and/or gaming machine activity data described herein. For example, when one or more gaming machines are identified as having less than a defined threshold of wagers placed, the trigger even can be initiated.

Examples of trigger events constructed in accordance with embodiments of the present invention include events unrelated to game play, and related to game play, e.g., the $N^{th}$ player/play of the night in the casino, or on a designated machine/bank of machines causes the trigger event to occur. In another example, the $100^{th}$ dollar/credit input to a designated machine causes occurrence of the trigger event on that machine. In another example, the $1^{st}$ person within a defined time period after 7:00 pm to play a designated machine or machines is to receive the promotional ticket.

In FIG. 2, responsive to occurrence of the trigger event in step 208, the method 200 proceeds to step 212, in which a controller in the gaming machine or apparatus associated with the gaming apparatus at which a player is located, receives a signal indicating occurrence of the trigger event. In one embodiment, in FIG. 1, the bonus server 136 has a suitable processor capable of executing instructions to initiate the trigger event, based on monitored data from the gaming apparatus in the wagering environment 100, such as player tracking information retrieved from a player tracking server 148. In another example, a bonus sub-server 152 coupled to network 104, in FIG. 1, is coupled to receive and identify data on which a trigger event can be based, and output a signal indicating occurrence of the trigger event to the gaming controllers in one or more of the gaming machines 128*a*, 128*b* in the bank 128.

In FIG. 2, in step 216, responsive to receiving an indication of the occurrence of the trigger event, the gaming machine controller at a gaming machine or other designated apparatus where the player is located, such as a kiosk or a table game, is operatively coupled to cause the associated ticket printer to generate and output a ticket, as described in greater detail herein, for promoting play of the designated bonus event. The ticket preferably has no monetary value, and authorizes participation in only the designated bonus event. In addition, in one embodiment, the ticket itself provides one or more plays of the designated bonus event.

Figure 4:
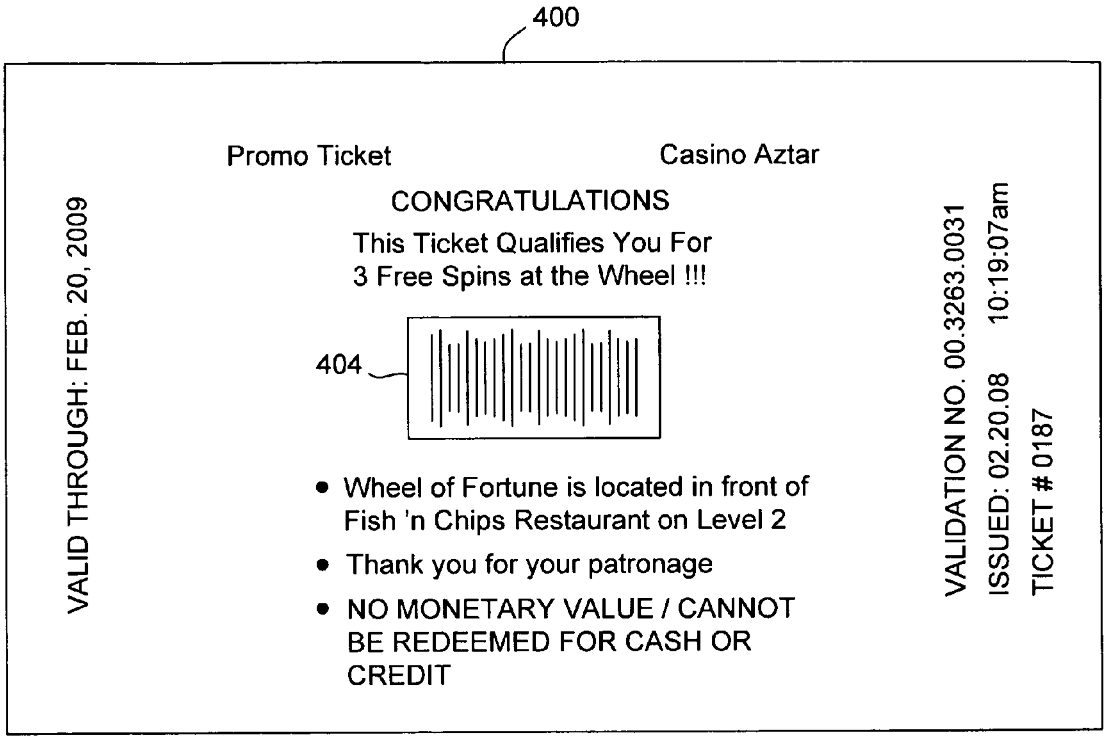
FIG. 4 shows an illustration of a promotional ticket 400 dispensed in accordance with one embodiment of the present invention.

Preferably, as further described herein with reference to FIG. 4, information identifying the purpose and limitations on the usage of the promotional ticket is printed on the surface of the ticket, to facilitate understanding by the player. In addition, additional helpful information can be printed on the face of the ticket, such as the location of the designated bonus event, and, in some complex wagering environment floor plans, a map and/or directions to finding the designated bonus event. Additional apparatus can be mounted or embedded in the ticket, such as a magnetic strip, a memory device, an RFID unit, and other suitable devices for storing the particulars of the capabilities and limitations of the ticket for later access and processing by the bonus device or gaming machine into which the ticket can be inserted.

In FIG. 2, in step 220, the flow of method 200, following the outputting of the promotional ticket in step 216, depends on whether a manual or automatic mode of ticket play is implemented. In some embodiments, aspects of both manual and automatic processing of the ticket can be implemented.

In FIG. 2, the manual mode of ticket play involves outputting the ticket from the ticket printer of the gaming machine at which player 116 is located, or otherwise manually delivering the ticket to the player 116, in step 224, for instance, from a casino attendant on the wagering environment floor. In step 228, the player can then locate the designated bonus event, for play of the bonus event. Those skilled in the art should appreciate that the player can choose to locate the designated bonus event immediately upon receiving the ticket or, alternatively, can wait and play the bonus event at some later time. Also, the player has the option of accumulating promotional tickets through ordinary game play or other activities, and choosing a convenient time to use all or a portion of the tickets to play the bonus event when desired.

In FIG. 2, in step 232, when the player locates the designated bonus event, the player provides the ticket to participate in and play the bonus event. For example, when the bonus event is implemented on a gaming machine, a ticket I/O device on the gaming machine is configured to receive the ticket, read information printed or otherwise stored on the ticket, and the gaming machine controller or suitable processor in the gaming machine processes that information accordingly for play of the bonus event. For example, upon receiving the ticket, the gaming machine controller may be configured to automatically bypass ordinary game play on the machine to initiate a bonus event, which can otherwise only be accessed through game play on that machine.

In an alternative implementation, responsive to the ticket I/O device reading bonus instructions off of the promotional ticket, the receiving gaming machine sends a signal to bonus server 136 over the network 104, in FIG. 1, the signal requesting authorization to proceed directly to bonus play on the gaming machine, bypassing regular game play on the machine. The gaming machine can proceed when a confirmation signal is received from the server 136.

In another example, a player approaches a bonus device 140, such as the Wheel of Fortune, and inputs the ticket into a ticket I/O device incorporated in or otherwise coupled to bonus device 140, to permit spinning of the wheel. In one example, the ticket may be coded to instruct the Wheel of Fortune device to allow the player an unlimited or specified number of spins over a specified period of time. For example, the player may be entitled to a free wheel spin every hour on the hour for six hours. In this way, the player is encouraged to remain in the wagering environment 100 in proximity to the bonus device 140.

In FIG. 2, returning to step 220, when automatic play of the ticket is implemented, the method proceeds to step 236, in which the ticket is automatically input or provided for play of the bonus event independent of any player action. For instance, upon occurrence of the trigger event, the controller of the gaming machine at which the player is located can be configured to output a visual message on a display of the gaming machine, indicating to the player that the player has automatically been entered into a tournament, raffle, lottery, or other designated bonus event. In such examples, preferably graphical information on the display of the gaming machine provides additional information as to the whereabouts, timing, and number of plays of the bonus event.

With automated play of the ticket, in step 236, the player is required to take no affirmative action to initiate entry and participation in the bonus event. By sending an electronic signal to supporting hardware, a player is automatically entered into a tournament, for instance, without having to pay an otherwise required entry fee to participate. That is, in this embodiment, the entry fee is waived responsive to receiving the ticket.

In other embodiments, a player may have to complete a series of events to receive a bonus award. For instance, the player may be required to view or collect a series of symbols, messages, tickets, or the like, from one or more gaming machines to earn a bonus award. In other examples, the player may be required to play a series of games to complete the set of events. In some instances, a gaming machine may remind players of what events to look for during game play. Also, a player may receive instructions on a printed ticket or through access to some other instrument, such as a smart card, etc. that may have the information stored on it.

Figure 3:
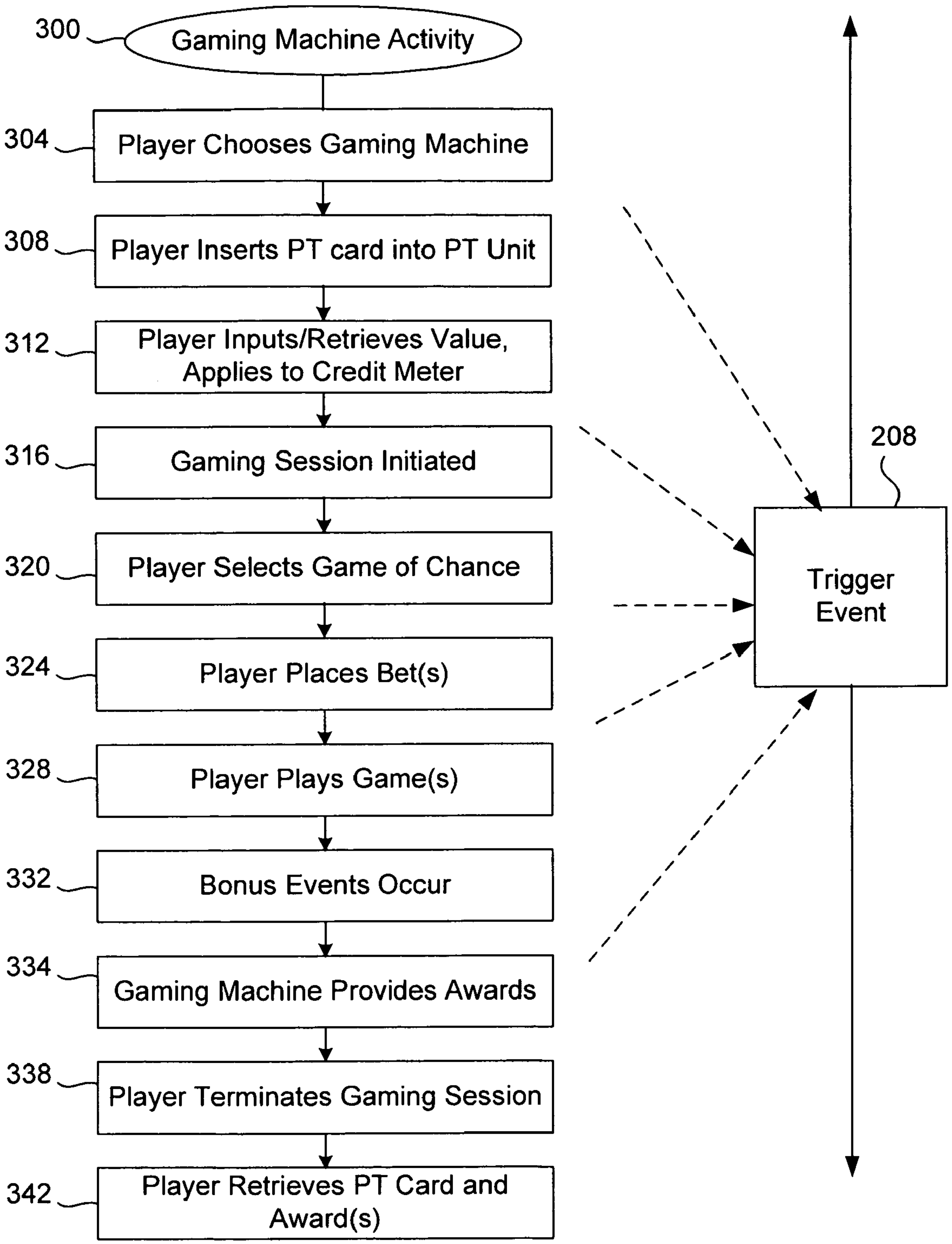
FIG. 3 shows a flow diagram of a method 300 of gaming machine activity in relation to the occurrence of a trigger event 208, performed in accordance with one embodiment of the present invention.

FIG. 3 shows a flow diagram of a method 300 of gaming machine activity in relation to the occurrence of a trigger event 208. The method 300 of FIG. 3 is intended to illustrate one embodiment of the occurrence of a trigger event 208 in relation to the actions occurring on a gaming machine when a player initiates a game play session on the machine. As will be shown, applying principles of the present invention, the trigger event 208 can be constructed so that a trigger event occurs based on one or more pre-defined actions in method 300, when desired. In other embodiments, the trigger event can be structured to occur independent of any activity on a gaming machine, such as being based on parameters and events not associated with gaming machine activity.

Generally, a master gaming controller (described below) and associated software or other logic instructions provide "primary game logic" and "bonus logic." The primary game logic is responsible for determining a game outcome and instructing the gaming machine to give a game presentation consistent with that outcome. The bonus logic is responsible for determining a bonus outcome in response to one or more user inputs during a bonus event. In simple embodiments, this involves nothing more than a determination that a bonus award should be given randomly and then instructing a printer or other mechanism to issue the printed ticket or other cashless indicia of the bonus award. In other embodiments, the bonus logic instructs the gaming machine to give a sophisticated bonus presentation. In some embodiments, such as that illustrated in FIG. 3, the bonus logic is coupled to the primary game logic in a manner allowing the bonus logic to detect events in the primary game that trigger issuance of the cashless indicia of bonus awards.

In FIG. 3, the method 300 begins in step 304, in which a player chooses a gaming machine to play a game. In some embodiments, the method(s) described herein include selecting certain machines as the machines at which promotional tickets are to be printed, and the trigger event 208 is structured so it only occurs on those machines. For example, in one scenario, a bank of heavily played machines are designated as capable of printing and issuing promotional tickets, which will designate and therefore promote playing of bonus events provided on a bank of under-played gaming machines at a different location on a casino floor. In another embodiment, a group of under-played machines are selected as the only machines capable of having/responding to a trigger event and printing promotional tickets. Thus, in such an implementation, the only way a player can obtain a promotional ticket is to play the under-played machines, thus encouraging play of those machines.

In one implementation, the trigger event 208 is structured so that a ticket is output from a gaming machine independent of step 304. For example, a gaming machine close to an entrance of the casino or a popular restaurant or sports bar is configured to receive an indication of a trigger event, either from the gaming machine itself or from a server, periodically and, for instance, at higher frequencies during times of high traffic volume in that area of the casino. In this way, players passing by the machine can be surprised to see the dispensing of a ticket, and become excited to use the ticket to play the designated bonus event.

In some instances, when the player has signed up for a player tracking program and received a player tracking card, in step 308, the player can choose to insert his or her player tracking card into a player tracking unit of the gaming machine. In some implementations, the trigger event 208 is structured so that the trigger event occurs responsive to the insertion of the player tracking card in step 308, or based on player tracking information in an account associated with the player tracking card. For example, a combination of player tracking criteria such as status, e.g. gold level, age, total amount wagered, and other data can be the basis for the trigger event.

The player tracking information can indicate that the player is a preferred player, a member of a special group, a single win recipient, or the like. One example of a preferred player or a member of a special group includes a member of a platinum players club, which indicates that the player is associated with a particular level of patronage at the gaming establishment. Another example includes members of a group who have participated in a particular frequency or level of patronage within a specified time period. Yet another example includes special guests of the gaming establishment, members of a particular tour group or conference group, or the like. The player tracking information used to determine whether a player is eligible for a secondary bonus can be stored on player tracking server 148 (FIG. 1).

In FIG. 3, in step 312, the player inputs money into the gaming machine or applies value in the form of credits from a player account, so that the player is enabled to begin placing wagers. Generally, a gaming session, in which one or more games can be played by the player, is initiated, in step 316, following the application of credits to the credit meter of the gaming machine, in step 312. Here, the trigger event 208 can be constructed so that it occurs responsive to the player inputting or applying value onto the credit meter of the gaming machine. In one example, the trigger event is structured so that it occurs responsive to the player applying equal to or more than a certain minimum amount of value onto the credit meter for play of games of chance, for instance, five dollars worth of credits. In another example, the trigger event 208 is structured to occur every Nth, e.g. $50^{th}$ application of value to the credit meter. Similarly, the trigger event 208 could be structured to occur responsive to the application of value to the coin-in meter of the machine.

In FIG. 3, in step 320, a player selects a game of chance to play, often one of a plurality of games of chance available on the machine. For instance, a list or menu of games of chance is often presented to the player, listing the available games on the machine. In one embodiment, the trigger event 208 is structured so that the selection of one or more pre-determined games in the list causes occurrence of the trigger event. Also, certain game themes or types may be associated with a theme or type of bonus event that the casino wishes to promote. Thus, such games can be pre-selected by the casino as causing occurrence of the trigger event 208.

In FIG. 3, in step 324, the player places bets to play the selected game of chance. Again, the trigger event 208 can be structured to be responsive to the bets placed in step 324. For instance, every $100^{th}$ bet placed by any player, or every $10^{th}$ "Max Bet" play by a "high-roller," e.g., a player with silver-or-above level status in a casino loyalty program, could cause the trigger event 208 to occur. In another example, bets placed equal to or above a certain threshold amount can cause occurrence of the trigger event 208. For instance, the trigger event 208 can be structured so that the wagering of a hundred dollars or more causes the trigger event to occur.

In FIG. 3, in step 328, the player plays one or more games on the machine during the gaming session. Here, the trigger even 208 can be constructed to be responsive to game play. For instance, the dealing of certain hands in a poker game, such as 4-of-a-kind, certain reel combinations, and/or the output of certain symbols, can cause occurrence of the trigger event 208. In another example, when a bonus or certain type of bonus occurs responsive to game play, the trigger event 208 is also activated. Other examples of game play events can be tied to cause the trigger event to occur. For instance, the winning of a jackpot, the length of time of game play, the volume of wagering, can all be tied to the trigger event, so the trigger event 208 occurs responsive to one or more such game play events. Also, in step 328, the trigger event 208 can be structured to occur responsive to the selection of one or more particular paylines, a number of paylines, and/or every Nth use of particular paylines on a machine.

In FIG. 3, in step 332, the gaming machine being played can be one that has bonus capabilities. In such instances, the trigger event 208 can be structured so that it is based on the occurrence of one or more such bonus events in step 332. For instance, the activation of a Wheel of Fortune wheel mounted on the gaming machine can cause the outputting of a ticket qualifying the player to play a central Wheel of Fortune bonus device 140 separate from the gaming machine being played. In another implementation, the winning of a jackpot or performance at some measurable level in a tournament can cause the trigger event 208 to occur. Also, the trigger event 208 can be constructed to cause outputting of the ticket as a consolation prize for participating in the bonus event. For instance, a player may lose a bonus round of play, but still receive a promotional ticket for qualifying for the bonus round. The consolation ticket encourages the player to keep trying at a designated machine or bonus device.

In FIG. 3, in step 334, when the player wins games, the gaming machine outputs awards corresponding to player winnings. In one implementation, the trigger event is structured so that it occurs responsive to the outputting of such awards, in step 334, for instance, when the player achieves winnings of or greater than a certain threshold amount.

In FIG. 3, in step 338, when the player decides that he or she is finished playing the gaming machine, the player can terminate the gaming session by hitting a "cash out" button and/or ejecting the player tracking card. In some implementations, the trigger event 208 is constructed so that it occurs responsive to such termination of the gaming session. In step 342, the player then retrieves the player tracking card and any winnings.

In FIG. 3, the examples of gaming machine activity in steps 304-342 are intended to represent examples of gaming machine activity upon which the occurrence of trigger event 208 can be based. Other actions occurring on or in relation to one or more gaming machines can be linked to the occurrence of a trigger event 208, as desired for the implementation. In addition, gaming machine activity over a bank of machines or a floor or region of a floor in a wagering environment can be centrally monitored, for instance, on a back-end server at the casino. In such instances, the trigger event can be constructed so it occurs responsive to the monitored gaming machine activity for one or more gaming machines at the back-end server. For instance, when a bank of machines is monitored and identified as having fewer wagers placed then desired, the trigger event can be structured so that those machines output tickets more frequently than other machines on the floor. In one example, the trigger event 208 is structured so that it occurs when the number of wagers placed or other measure of activity on a bank of gaming machines falls below a predetermined level.

In addition, in other implementations, the trigger event is connected to other actions unrelated to game play, for instance, at the discretionary control of the casino, and/or the occurrence of random events, such as a particular number output by a random number generator.

Promotional tickets may be generated in a number of manners. In one embodiment, a player's play of any gaming machine in the environment 100 is tracked. Data regarding the player's play is stored at the player tracking server 148. The player tracking server 148 is also preferably arranged to monitor the play data such that, if the player reaches predetermined levels of play or other criteria of play exist, the player is awarded a promotional ticket. In another embodiment, the play of a particular gaming machine may trigger a promotional ticket award. As is known, the tracking of the play of a particular player may be initiated by the player identifying themselves, such as by swiping a magnetic stripe of a player tracking/identification card through a card reader associated with the gaming machine. Of course, the means by which a player may identify themselves is not limited, and may include for example smart cards, proximity cards and other means now known or later developed.

The criteria for awarding a promotional ticket may vary. In a preferred embodiment of the invention, the player is rewarded a promotional ticket based upon criteria independent of the direct outcome of a game played at the gaming machine. In this regard, the promotional ticket is above and beyond any award provided to the player based on the outcome of a player's game, and does not require further or additional consideration (such as an additional bet) by the player. The promotional ticket may be awarded based upon frequency or time of play, actual losses, theoretical win or a wide variety of criteria other than the direct win or loss of a game.

A promotional ticket may also be awarded to a player at the discretion of the game operator or casino. For example, regardless of the length of time a player has been playing, the operator may instruct the machine to issue a receipt qualifying the player for a bonus event. The operator may also cause promotional tickets representing bonus events independent of game play to be issued at several gaming machines.

In one embodiment, once a player is entitled to a promotional ticket, the bonus server 136 of FIG. 1 is adapted to send a signal to the gaming machine to cause the gaming machine to issue a promotional ticket. In one embodiment, the player may be provided with an opportunity to select the promotion which is given. For example, for reaching a predetermined level of play, a player may be permitted to select one bonus event from a list of bonus events. This list may be transmitted from the player tracking server 148 for display by the gaming machine to the player. The player may then input their selection. The gaming machine is then arranged to print the receipt representative of the selected bonus event. Information regarding the bonus event which has been awarded is stored at the player tracking server 148 and printed on the receipt.

In one embodiment, the promotional ticket may be issued at a gaming machine or other location, such as at the front desk of the hotel/casino to new patrons or at a station when a player joins a player tracking/rewards club of the casino. The gaming machine may be configured to print the ticket based on tracked play or, as indicated above, the player tracking server 148 or other device may track play and then send a signal to the gaming machine causing the gaming machine to print the ticket.

The use of player tracking server 148 in FIG. 1 facilitates ready identification of a player with particular characteristics. For example, it is possible to determine if a particular player is playing a game. In addition, however, it is possible to examine particular characteristics of play by that player or a defined group of players. Using these characteristics, a casino or other entity can carefully target players for specific advertising/marketing or the award of a promotional ticket. For example, a user of the system can determine, in real-time, the amounts which are being wagered and/or won by a player on certain machines. Thus, the user can not only determine if a player is playing a game, but which players are betting or wagering the highest amounts or winning or losing the most money. The user may then target those players for specific promotions by issuing promotional tickets. For example, a player betting large sums may receive a promotional ticket for their play, even though they have not accrued sufficient points to be awarded a comp. Players who have lost large sums of money with may also be targeted with promotional tickets to entice those players to not stop playing, but instead play for a longer period of time.

In accordance with embodiments of the invention, a casino can identify players which are to receive promotional tickets based on their present or future predicted play. In addition, once such a player is identified, it is possible to know where that player is and have casino personnel travel to them and personally and immediately provide them with a promotional ticket. For example, a particular player of a table game betting large amounts may be identified. The user of the system may also identify the particular table at which that player is playing, and then contact a floor person to travel to them and provide the player with the ticket. In accordance with the invention, a casino can also reward a player based upon their past play or play history.

In FIG. 1, the player tracking server 148 may be programmed to scan current game play data to identify particular players to receive promotional tickets. For example, a casino operator may program specific filtering criteria which are scanned against the received game play data. Such criteria may comprise a certain length of time for a single player, total coin or credits in, credits or coins won, a number of player points rewarded in a particular session, a number of games played or the like. In the event such criteria are met by the current play of a device or event by a player, then an indication of such may be provided to the user. The indication may be an audible or visible alarm, such as the direct presentation of information regarding the player's identity and game play information which met the criteria.

FIG. 4 shows a promotional ticket 400 generated in accordance with one embodiment of the present invention. This may include a paper ticket or voucher or a smart card, for example. As used herein, the term "ticket" is intended to encompass other portable gaming instruments, often with some form of printing thereon, including printed-paper tickets and printed plastic cards. A paper ticket may comprise any card stock or gloss covering as determined by a desired quality for the ticket and/or by a scanner included in a gaming machine that receives the ticket. Printing on plastic cards is becoming increasingly popular, less expensive and is suitable for use with the present invention. Plastic cards that include a magnetic strip, or an RFID tag, that stores information are also suitable for use herein. A magnetic card reader that communicates with the gaming machine, and software on the gaming machine or network performs methods of promoting play of bonus events, as described herein. Although embodiments of the present invention are primarily described with respect to printed tickets to ease description and discussion, it is understood that techniques discussed herein are applicable to any portable gaming instruments, not just printed tickets.

As noted above, the ticket 400 may have a variety of forms. For example, a bar coding 404 may be accomplished with different colors of material comprising the ticket, such as by exposing thermoplastic to high heat or the like to generate the spaced bars. The magnetic stripes or chips or similar information storage elements may be associated with the ticket for use in storing the information described herein. In one embodiment, information may be coded in the form of punch holes or other patterns of material or voids of material.

In one embodiment, the promotional ticket 400 includes information indicating what event(s) the ticket qualifies the player to participate in. For example, in FIG. 4, the ticket is printed with explanatory text, stating "This ticket qualifies you for 3 free spins at the Wheel!" In other examples, the ticket designates a particular bonus event or theme available on a number of gaming machines or bonus devices. The player is permitted to select which available machine(s) or device(s) on which he or she wishes to play the bonus event.

In FIG. 4, the "3 free spins" is one example of a designated number of plays of the bonus event, separate and apart from any credit or cash value ordinarily used by players to play wagering games in a casino or other gaming environment. In addition, the ticket 400 preferably includes information identifying a location of the designated bonus event, to facilitate location of the event by the player. For example, in FIG. 4, the ticket includes printing on its surface, stating: "Wheel of Fortune is located in front of Fish & Chips Restaurant on Level 2." In one embodiment, the ticket has an expiration date, as also indicated on ticket 400. In this way, the player is encouraged to use the ticket for participation in the bonus event sooner rather than later, to keep the player engaged in participation of bonus events and other events in the casino.

As used herein, the terms "plays" and "game plays" are intended to generally refer to plays on a bonus device or gaming machine, independent of any cash or credits used by players to play games of chance. For instance, the "plays" can designate a number of plays, a time period during which a limited or unlimited number of plays can be made, one or more rounds in a bonus event, and particular types of plays such as a spin on a wheel or a raffle entry. The plays are generally not related to credits or cash, nor are the plays otherwise redeemable for credits or cash. Also, such "plays," since they are differentiated from wagering activity, can refer to accelerated, enhanced, modified, and/or special types of play that are not ordinarily available by placing cash/credit wagers on a game of chance on a machine or at a table.

In FIG. 4, preferably the ticket also indicates to the player that the ticket has no associated monetary value, that is, the ticket cannot be redeemed for cash or credits. Again, such information can be printed on the surface of the ticket. In addition, data stored in a magnetic strip, memory, or other recordable medium embedded or situated on the ticket 400 provides such information, including the information described above with respect to FIG. 4, to the gaming machine or a bonus device into which the ticket 400 can be inserted for participation in the bonus event. Data stored in the recordable medium also indicates the designated bonus event, so the machine or bonus device receiving the ticket can immediately ascertain whether the ticket qualifies for play of that event.

In another embodiment, the player's identity may be determined from information associated with the ticket or receipt 400 when it is generated. For example, as described above, a promotional ticket 400 may be printed and include a bar code 404 or other information. Player identification information, such as a player's name obtained via the player tracking system or a code obtained from the player's player tracking card, may be printed onto the ticket 400. The information may be printed in direct form, such as the player's actual name, or may be encoded, such as in the case of a bar code. Such information can be read and processed by the bonus device(s) or other apparatus when the ticket is redeemed, to further monitor player activity and the effectiveness of the promotion. In an alternative embodiment, player identification information is omitted from the ticket.

In one or more embodiments, as described in part above, tickets may be provided to a player by other than by direct play of a gaming machine. For example, tickets may be issued in complimentary fashion by operators of hand-held devices and distributed randomly.

Figure 5:
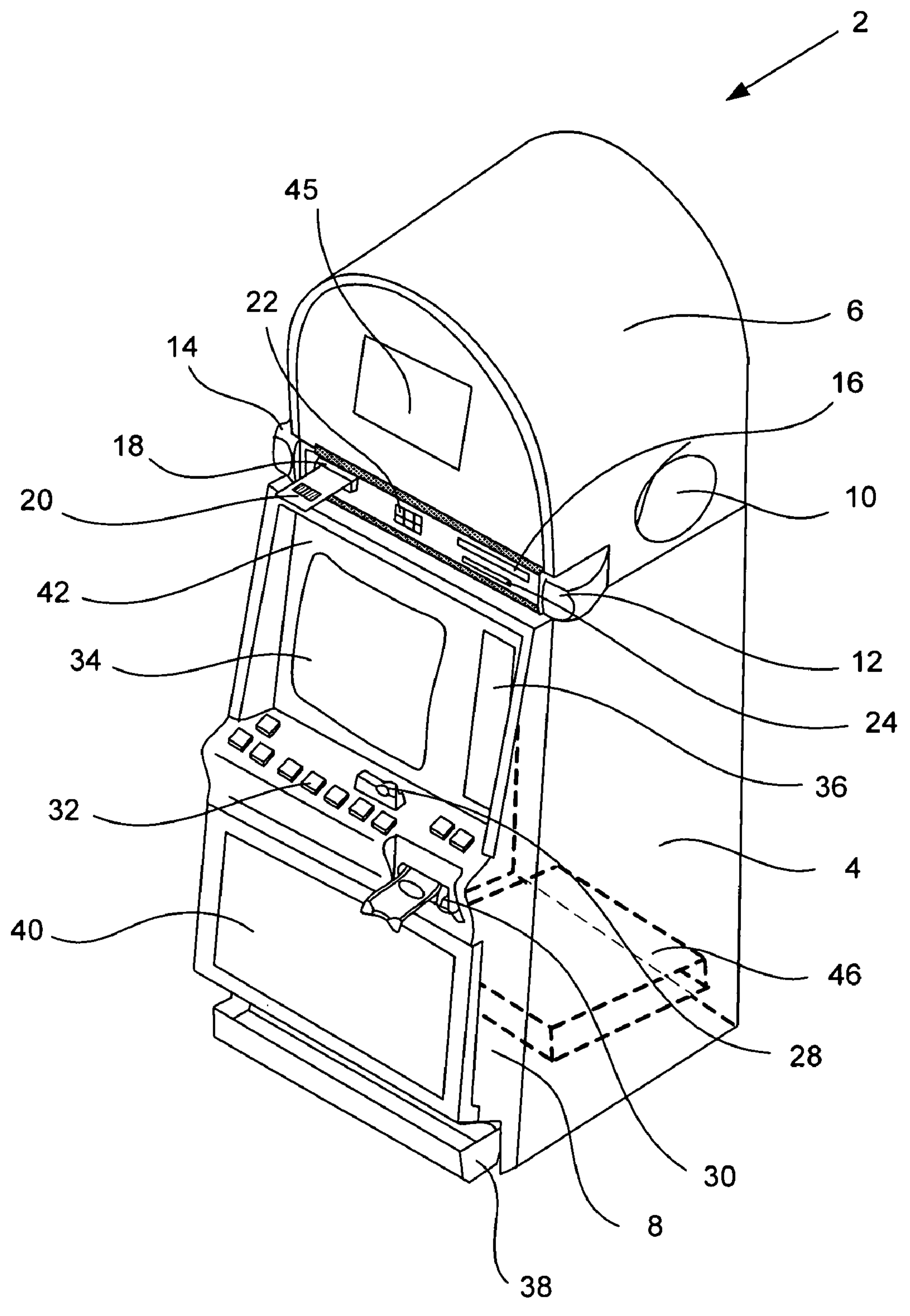
FIG. 5 shows an illustration of a gaming machine, constructed in accordance with one embodiment of the present invention.

Next some examples of gaming devices, gaming systems, network devices and system architectures that may be utilized with the methods and architecture described with respect to FIGS. 1-4 are described. As illustrated in the example of FIG. 5, machine 2 includes a main cabinet 4, which generally surrounds the machine interior and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2.

According to a specific embodiment, the devices may be controlled by code executed by a master gaming controller 46 housed inside the main cabinet 4 of the machine 2. The hardware and software associated with the master gaming controller 46 may be distributed throughout the cabinet 4 and is not limited to the specific location illustrated in FIG. 5. In specific embodiments where it may be required that the code be periodically configured and/or authenticated in a secure manner, the technique of the present invention may be used for accomplishing such tasks.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

As illustrated in the example of FIG. 5, the gaming machine 2 may include a top box 6, which sits on top of the main cabinet 4. The top box 6 may house a number of devices, which may be used to add features to a game being played on the gaming machine 2, including speakers 10, 12, 14, a ticket printer 18 which prints bar-coded or otherwise encoded tickets 20, such the tickets promoting play of bonus events described herein, a key pad 22 for entering player tracking information, a florescent display 16 for displaying player tracking information, a card reader 24 for entering a magnetic striped card containing player tracking information, and a video display screen 45.

The ticket printer 18 is one example of a ticket I/O device that may be used to print the promotional tickets described herein, as well as tickets for a cashless ticketing system. The ticket printer 18 may comprise a variety of now known or later-developed devices. In general, the ticket printer 18 comprises a device for generating a ticket or receipt having information associated therewith. In one embodiment, the receipt is generated by printing, such as with ink, information onto an element. It is contemplated, however, that the information need not be printed, but may be generated and associated with the receipt in other manners. For example, electronic data may be generated and then "written" to a magnetic stripe of the ticket. In one embodiment, the ticket is constructed from paper or a similar material. The ticket or receipt may comprise a wide variety of other elements or members, however, such as cards or the like.

Though not illustrated in detail, the gaming machine includes appropriate elements for generating the tickets. The gaming machine may include, for example, a ticket storage device for storing blank or unprinted tickets. In one or more embodiments, a controller is provided for controlling the operation of the ticket printer 18. In one example, the master gaming controller of the machine may include a bus with which a printer controller is associated. In this manner, the gaming controller may provide instructions, such as print instructions, to the printer for printing tickets.

Further, the top box 6 may house different or additional devices not illustrated in FIG. 5. For example, the top box may include a bonus wheel or a back-lit silk screened panel, which may be used to add bonus features to the game being played on the gaming machine or a wireless interface for communication with a patron card. As another example, the top box may include a display for a progressive jackpot offered on the gaming machine. During a game, these devices may be controlled and may be powered, in part, by circuitry (e.g. a master gaming controller) housed within the main cabinet 4 of the machine 2.

It will be appreciated that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., balance) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758, 828, titled, "Frame Capture of Actual Game Play," each of which is incorporated by reference and for all purposes.

Another feature of gaming machines, such as IGT gaming computers, is that they often include unique interfaces, including serial interfaces, to connect to specific subsystems internal and external to the gaming machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the gaming machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, e.g., via software for reading status registers. This can trigger event log entries and further data authentication operations by the gaming machine software.

Trusted memory devices and/or trusted memory sources are preferably included in an IGT gaming machine computer to ensure the authenticity of the software that may be stored on less secure memory subsystems, such as mass storage devices. As previously noted a JAM card in a gaming machine may treat information received from the master gaming controller as not trusted as it may be unaware that the gaming machine includes a trusted memory device. Trusted memory devices and controlling circuitry are typically designed to not allow modification of the code and data stored in the memory device while the memory device is installed in the gaming machine. The code and data stored in these devices may include authentication algorithms, random number generators, authentication keys, operating system kernels, etc. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of the verification algorithms included in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "Secured Virtual Network in a Gaming Environment", naming Nguyen et al. as inventors, filed on Mar. 10, 2005, herein incorporated in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

Returning to the example of FIG. 5, when a user wishes to play the gaming machine 2, he or she inserts cash through the coin acceptor 28 or bill validator 30. Additionally, the bill validator may accept a printed ticket voucher, which may be accepted by the bill validator 30 as indicia of credit when a cashless ticketing system is used. In addition, the gaming machine may include an interface that allows a patron card or other portable device such as a ticket described with respect to FIGS. 1-4 to communicate with the gaming machine.

At the start of the game, the player may enter playing tracking information using the card reader 24, the keypad 22, and the florescent display 16. Further, other game preferences of the player playing the game may be read from a card inserted into the card reader. In one embodiment, the card reader on the gaming machine may be configured to accept the tickets described with respect to FIGS. 1-4. Further, the player tracking unit may include a JAM card that allows credits to be transferred to and from the gaming machine and to and from the patron card via the player tracking unit. In particular, the player tracking unit may be operable to communicate with a cashless server.

During the game, the player may view game information using the video display 34. Other game and prize information may also be displayed in the video display screen 45 located in the top box. During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one or more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games, promotions, or to redeem a prize. Further, the player may receive a ticket 20 for food, merchandise, or games from the printer 18 or information that allows food or merchandise may be transferred to a patron card.

Figure 6:
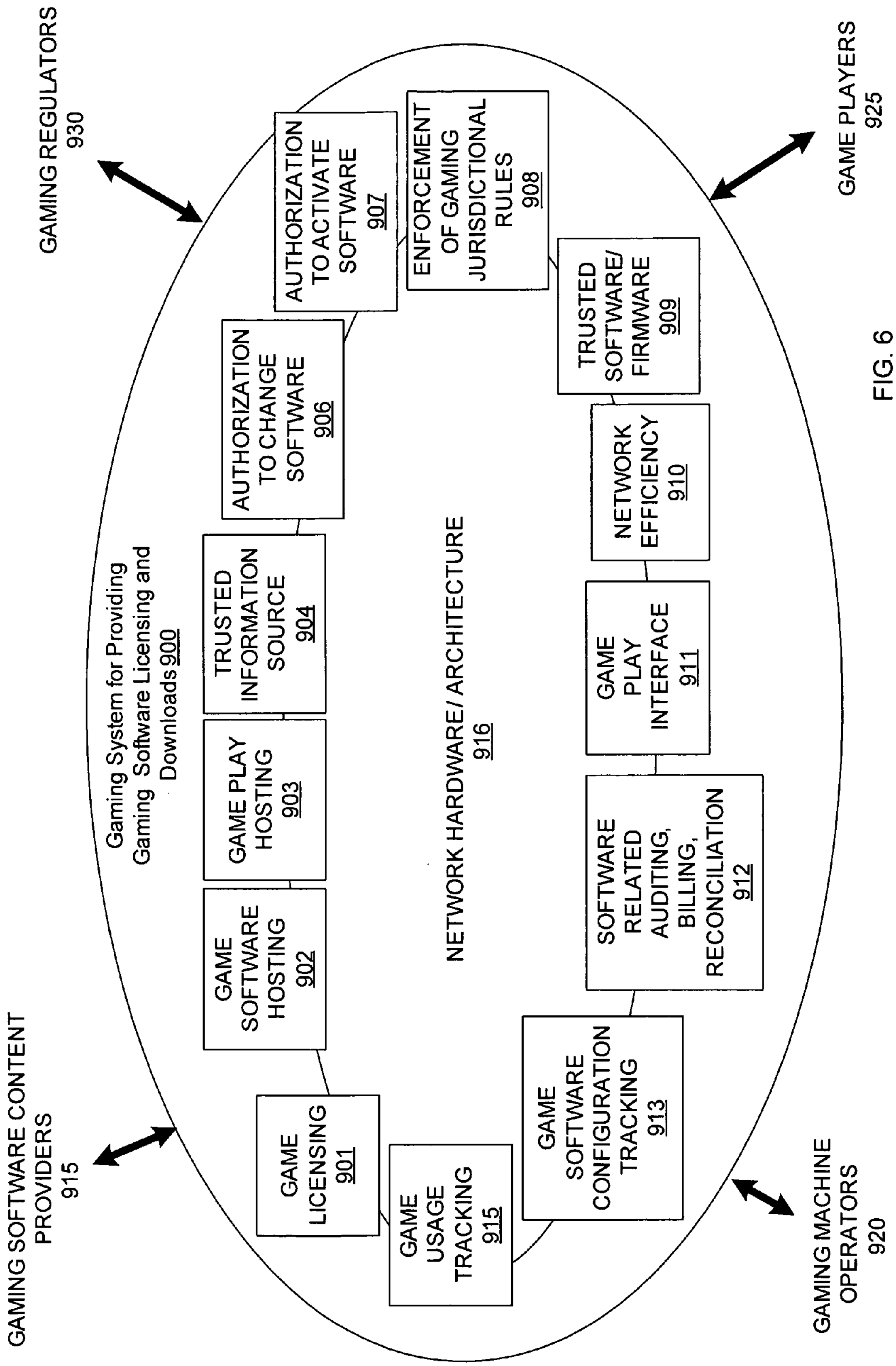
FIG. 6 shows an illustration of a gaming system and associated components, constructed in accordance with one embodiment of the present invention.

FIG. 6 shows a block diagram illustrating components of a gaming system 900 which may be used for implementing various aspects of the present invention. In FIG. 6, the components of a gaming system 900 for providing game software licensing and software downloads are described functionally. The described functions may be instantiated in hardware, firmware and/or software and executed on a suitable device. These downloads may include downloads of applets for JAM cards or patron cards and software for allowing terminals to interact with JAM cards or patron cards. In the system 900, there may be many instances of the same function, such as multiple game play interfaces 911. Nevertheless, in FIG. 6, only one instance of each function is shown. The functions of the components may be combined. For example, a single device may comprise the game play interface 911 and include trusted memory devices or sources 909. The described components and their functions may be incorporated in various embodiments of the servers and devices described with respect to FIGS. 1-4.

The gaming system 900 may receive inputs from different groups/entities and output various services and/or information to these groups/entities. For example, game players 925 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 900, receive revenue for the use of their software and compensate the gaming machine operators. The gaming regulators 930 may provide rules and regulations that must be applied to the gaming system and may receive reports and other information confirming that rules are being obeyed.

In the following paragraphs, details of each component and some of the interactions between the components are described with respect to FIG. 6. The game software license host 901 may be a server connected to a number of remote gaming devices that provides licensing services to the remote gaming devices. For example, in other embodiments, the license host 901 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 915 may track the usage of game software on a plurality of devices in communication with the host. The game usage-tracking host 915 may be in communication with a plurality of game play hosts and gaming machines. From the game play hosts and gaming machines, the game usage tracking host 915 may receive updates of an amount that each game available for play on the devices has been played and on amount that has been wagered per game. This information may be stored in a database and used for billing according to methods described in a utility based licensing agreement.

The game software host 902 may provide game software downloads, such as downloads of game software or game firmware, to various devious in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in co-pending U.S. Pat. No. 6,645,077, by Rowe, entitled, "Gaming Terminal Data Repository and Information System," filed Dec. 21, 2000, which is incorporated herein in its entirety and for all purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC's and PDA's. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources, such as the HSM previously described. Trusted information sources 904 may be devices, such as servers, that provide information used to authenticate/activate other pieces of information. CRC values used to authenticate software, license tokens used to allow the use of software or product activation codes used to activate to software are examples of trusted information that might be provided from a trusted information source 904. Trusted information sources may be a memory device, such as an EPROM, that includes trusted information used to authenticate other information. For example, a game play interface 911 may store a private encryption key in a trusted memory device that is used in a private key-public key encryption scheme to authenticate information from another gaming device.

When a trusted information source 904 is in communication with a remote device via a network, the remote device will employ a verification scheme to verify the identity of the trusted information source. For example, the trusted information source and the remote device may exchange information using public and private encryption keys to verify each other's identities.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 900 of the present invention may include devices 906 that provide authorization to download software from a first device to a second device and devices 907 that provide activation codes or information that allow downloaded software to be activated. The devices, 906 and 907, may be remote servers and may also be trusted information sources. One example of a method of providing product activation codes that may be used with the present invention is describes in previously incorporated U.S. Pat. No. 6,264,561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in the present inventions, network efficient devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. In one embodiment, the software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 6. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of the present invention.

Figure 7:
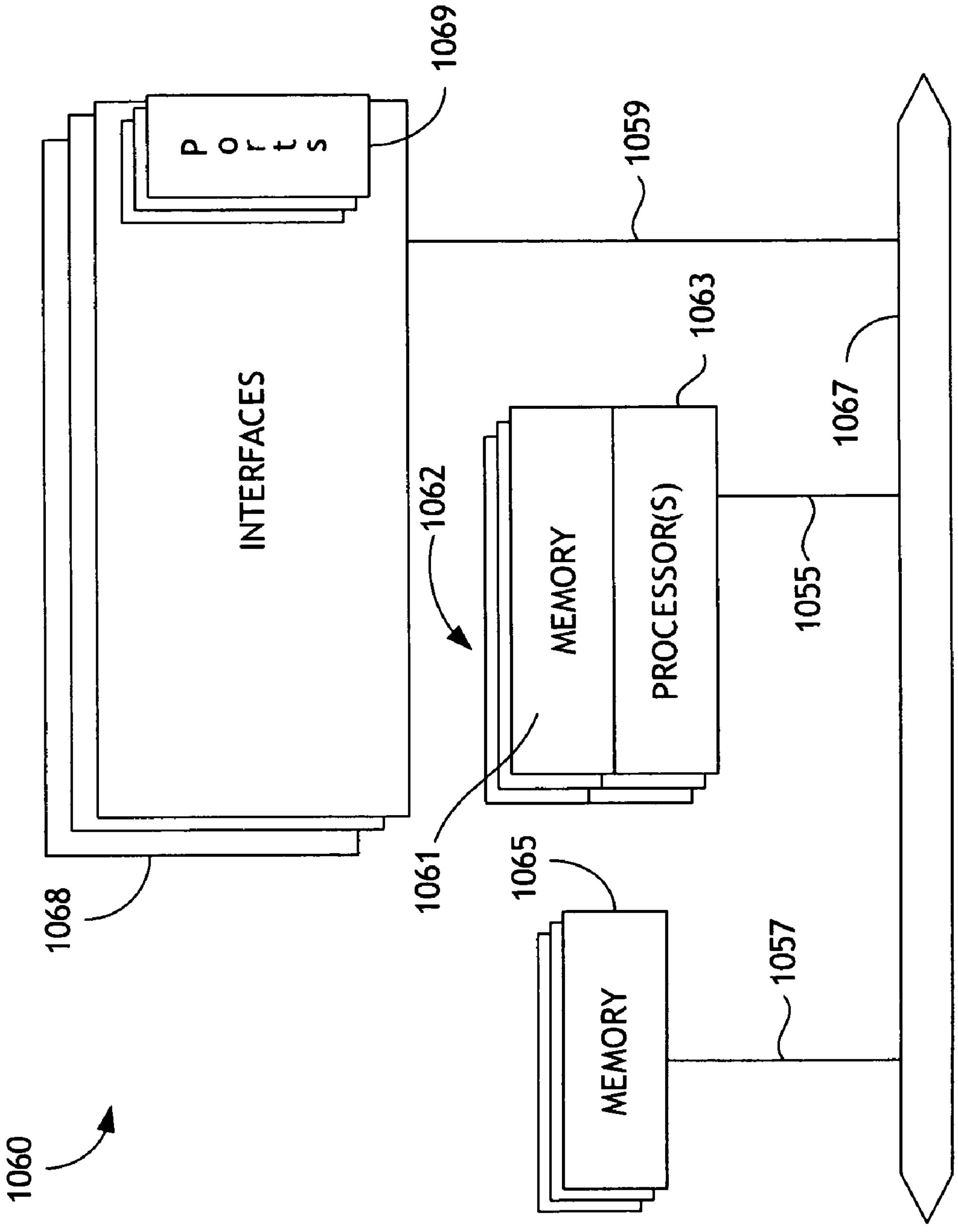
FIG. 7 shows an illustration of components of a server, constructed in accordance with one embodiment of the present invention.

FIG. 7 illustrates an example of a network device that may be configured for implementing some methods of the present invention. Network device 1060 includes a master central processing unit (CPU) 1062, interfaces 1068, and a bus 1067 (e.g., a PCI bus). Generally, interfaces 1068 include ports 1069 appropriate for communication with the appropriate media. In some embodiments, one or more of interfaces 1068 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1068 control such communications-intensive tasks as encryption, decryption, compression, decompression, packetization, media control and management. By providing separate processors for the communications-intensive tasks, interfaces 1068 allow the master microprocessor 1062 efficiently to perform other functions such as routing computations, network diagnostics, security functions, etc.

The interfaces 1068 are typically provided as interface cards (sometimes referred to as "linecards"). Generally, interfaces 1068 control the sending and receiving of data packets over the network and sometimes support other peripherals used with the network device 1060. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1062 may be responsible for implementing specific functions associated with the functions of a desired network device. According to some embodiments, CPU 1062 accomplishes all these functions under the control of software including an operating system and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

Regardless of network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 7) or switch fabric based (such as a cross-bar).

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. In a wagering environment with one or more gaming machines providing one or more games of chance, a method for promoting play of a bonus event comprising:

receiving from a player, at an input device of a gaming machine, a wager to play a game of chance, the gaming machine configured to output an award for play of the game of chance;

receiving an indication of occurrence of a trigger event for promoting play of a designated bonus event differentiated from games of chance, the designated bonus event excluding any bonus event on the gaming machine and identified as situated on a device apart from the gaming machine based on usage of the device;

outputting, responsive to the indication of occurrence of the trigger event, a ticket from an output device of the gaming machine, the ticket having no associated monetary value, the ticket having bonus information thereon, the bonus information authorizing participation in only the designated bonus event and providing one or more plays of the designated bonus event.

2. The method of claim 1, wherein the device is a bonus device.

3. The method of claim 1, wherein the designated bonus event is provided on a table.

4. The method of claim 1, wherein the designated bonus event is provided in a predetermined location of the gaming environment.

5. The method of claim 1, the ticket further having information identifying a location of the designated bonus event.

6. The method of claim 1, wherein the designated bonus event includes an event selected from the group consisting of: a tournament, a Wheel of Fortune™ bonus, a raffle, and a lottery.

7. The method of claim 1, wherein the designated bonus event is provided on one or more further gaming machines.

8. The method of claim 7, wherein the one or more further gaming machines provides a designated game or game type.

9. The method of claim 7, wherein the one or more further gaming machines is located in the wagering environment.

10. The method of claim 1, wherein the one or more plays correspond to an item selected from the group consisting of: a number of plays, a number of rounds, a number of spins, periodic play, a time period for play, and a period of accelerated play.

11. The method of claim 1, wherein the trigger event occurs responsive to play of the game of chance.

12. The method of claim 1, wherein the trigger event occurs responsive to a bonus event on the gaming machine.

13. The method of claim 1, wherein the trigger event occurs based on usage of the one or more gaming machines.

14. The method of claim 13, wherein the usage is assessed over a time period.

15. The method of claim 13, wherein the designated bonus event is provided on a less used one of the gaming machines.

16. The method of claim 1, wherein the trigger event occurs based on player tracking information identifying the player.

17. The method of claim 1, wherein the trigger event is a random event.

18. The method of claim 1, wherein the ticket has an expiration date for participation in the designated bonus event.

19. A gaming machine in a wagering environment providing one or more games of chance and capable of promoting play of a bonus event, the gaming machine comprising:

an input device adapted to receive from a player a wager to play one or more games of chance;

a value output device adapted to output an award for play of the one or more games of chance;

a gaming controller configured to receive an indication of occurrence of a trigger event for promoting play of a designated bonus event differentiated from game of chances, the designated bonus event excluding any bonus event on the gaming machine and identified as situated on a device apart from the gaming machine based on usage of the device; and a ticket output device adapted to output, responsive to the indication of occurrence of the trigger event, a ticket having no associated monetary value, the ticket having bonus information thereon, the bonus information authorizing participation in only the designated bonus event and providing one or more plays of the designated bonus event.

20. The gaming machine of claim 19, wherein the designated bonus event is provided on one or more further gaming machines.

21. The gaming machine of claim 20, wherein the one or more further gaming machines provides a designated game or game type.

22. The gaming machine of claim 19, wherein the trigger event occurs responsive to play of the game of chance.

23. The gaming machine of claim 19, wherein the trigger event occurs responsive to a bonus event on the gaming machine.

24. The gaming machine of claim 19, wherein the trigger event occurs based on usage of the one or more gaming machines.

25. The gaming machine of claim 19, wherein the trigger event occurs based on player tracking information identifying the player.

26. The gaming machine of claim 19, wherein the trigger event is a random event.

27. A gaming machine in a wagering environment with one or more games of chance and capable of promoting play of a bonus event, the gaming machine comprising:

an input device adapted to receive from a player a wager to play one or more games of chance;

a value output device adapted to output an award for play of the one or more games of chance;

a ticket input device adapted to receive a ticket having no associated monetary value, the ticket having bonus information thereon, the bonus information authorizing participation in only a designated bonus event on the gaming machine and providing one or more plays of the designated bonus event, the designated bonus event differentiated from game of chances and used to promote usage of the gaming machine, wherein the gaming machine is identified based on usage of the gaming machine in comparison with usage of one or more gaming machines in the wagering environment; wherein the ticket was obtained from the one or more gaming machine, a controller configured to initiate play of the designated bonus event responsive to receiving the ticket having the bonus information.

28. The gaming machine of claim 27, wherein the controller is configured to initiate play of the designated bonus event responsive to receiving the ticket having the bonus information independent of play of the one or more games of chance.

29. The gaming machine of claim 27, further comprising:

a bonus output device adapted to output, responsive to play of the designated bonus event, a bonus prize.

30. The gaming machine of claim 27, wherein the input device includes the ticket input device.

* * * * *